United States Patent
Transchel

[11] Patent Number: 5,938,226
[45] Date of Patent: Aug. 17, 1999

[54] MOTORCYCLE TOW HITCH

[76] Inventor: John Michael Transchel, 836 Golf Cir., Pleasant Hill, Calif. 94523

[21] Appl. No.: 08/744,030

[22] Filed: Nov. 5, 1996

[51] Int. Cl.⁶ ..................................................... B60P 3/06
[52] U.S. Cl. ............................................ 280/402; 414/563
[58] Field of Search ............................ 280/402; 414/560, 414/563

[56] References Cited

U.S. PATENT DOCUMENTS

| | | | |
|---|---|---|---|
| 2,489,771 | 11/1949 | Gibson | 280/402 |
| 2,789,832 | 4/1957 | Zumwalt | 280/402 |
| 3,430,983 | 3/1969 | Jones | 280/402 |
| 3,822,898 | 7/1974 | Brownlie | 280/402 |
| 4,434,993 | 3/1984 | Curtis | 280/402 |
| 4,761,015 | 8/1988 | Carr | 280/402 |
| 5,531,560 | 7/1996 | Bartholomew | 280/402 |
| 5,620,197 | 4/1997 | Howes | 280/402 |
| 5,674,044 | 10/1997 | Ranes | 280/402 |
| 5,697,629 | 12/1997 | Guild | 280/402 |

FOREIGN PATENT DOCUMENTS

| | | | |
|---|---|---|---|
| DT197809 | 9/1978 | Germany | 280/402 |

*Primary Examiner*—J. J. Swann
*Assistant Examiner*—Jim McClellan
*Attorney, Agent, or Firm*—Harold D. Messner

[57] ABSTRACT

The present invention related a towing hitch for towing an up-sloped positioned motorcycle at the rear of a motor vehicle having a Class III receiver, the towing hitch comprising an anchoring support assembly attached to the Class III receiver, the latter including a L-shaped housing, a winch barrel pivotally attached between upright side walls and pivotal about a transverse axis and a winch belt operationally attached to the winch barrel and wound about a major circumferential portion of the front tire of the motorcycle. In one aspect, the full span of the circumference of the front tire is augmented by a metallic, arcuate pivot arm attached between and projecting from the side walls at the front of the L-shaped housing via a second transverse pivot axis positioned a distance D above the earth's surface where D is about equal to the radius R of the front wheel. In another aspect, the belt is bifurcated at its attached to the arcuate pivot arm to allow for easy attachment about the tread of the front tire. In yet another aspect, the L-shaped housing is pivotally attached at its rear wall along a vertical direction normal to the earth's surface relative to the Class III receiver. Result: the trailing capability of the motorcycle via the rear wheel only, is enhanced.

12 Claims, 4 Drawing Sheets

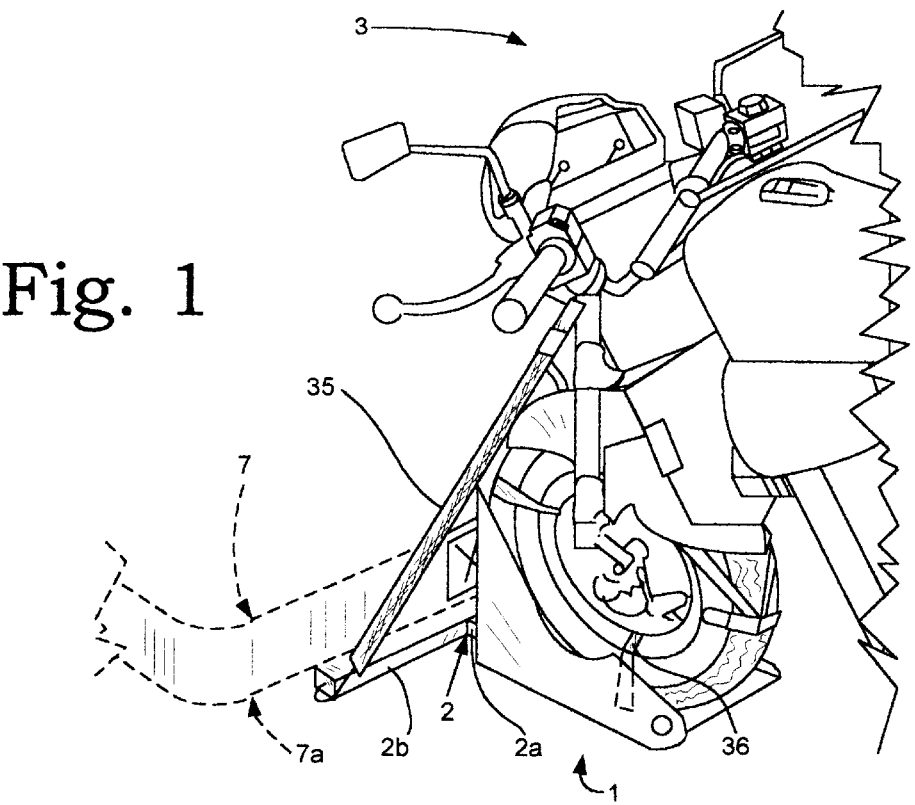
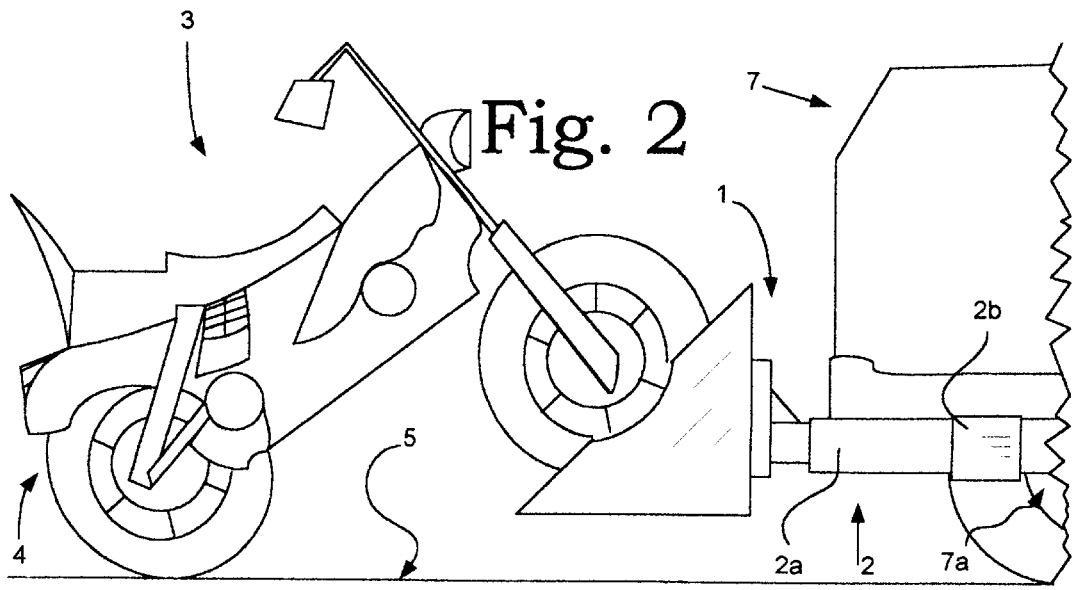

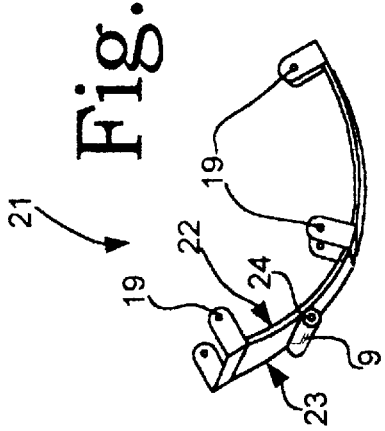
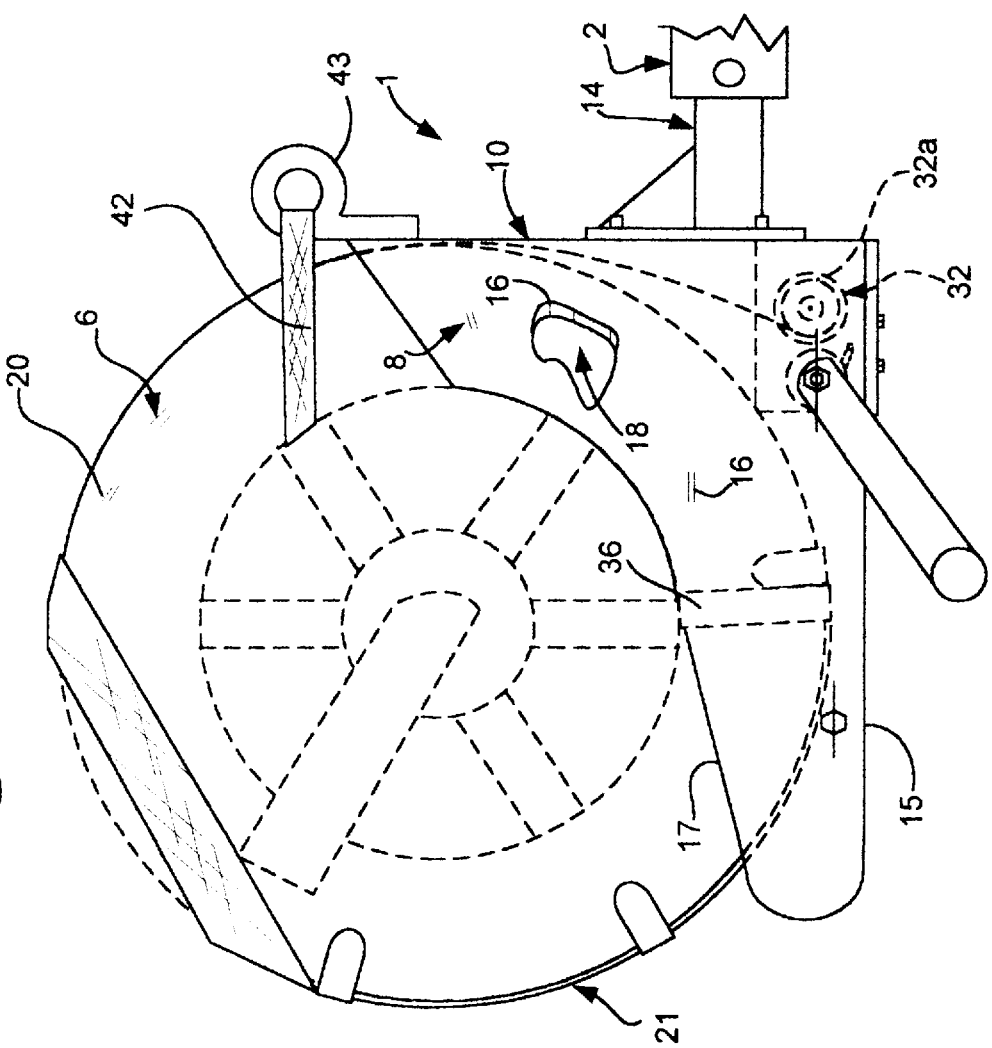

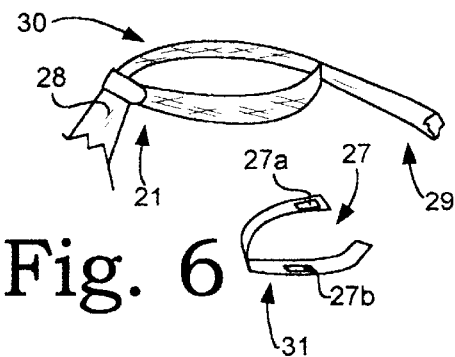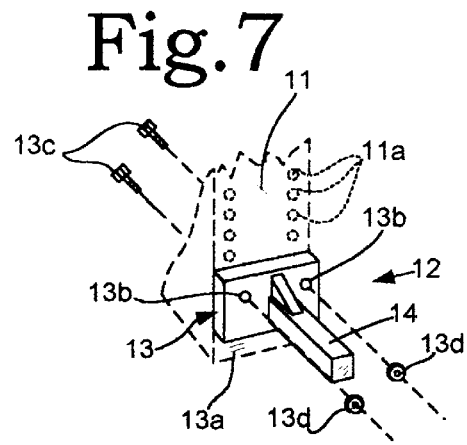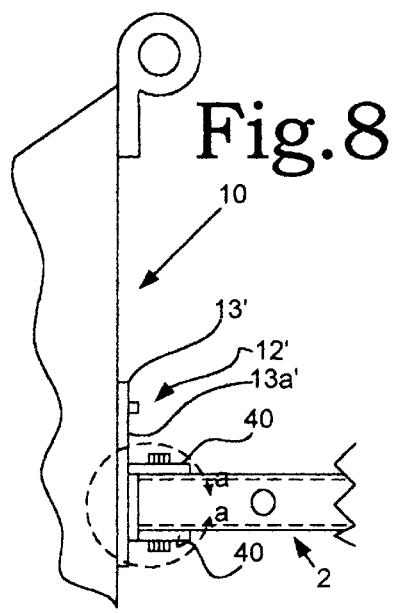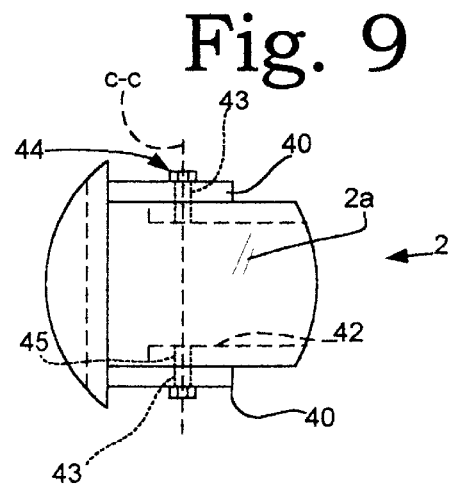

MOTORCYCLE TOW HITCH

SCOPE OF THE INVENTION

The present invention related to a towing hitch for releasably anchoring a front wheel of a motorcycle in an up-raised position relative to a conventional Class III receiver attached to the under-carriage of a motor vehicle (rear wheel is road contact therebehind) and more particularly to such a towing hitch that is so compact it can be stowed within the motor vehicle when not in use but can easily be deployed by a single person in contact with the Class III receiver, then after moving the front wheel of the upright motorcycle adjacent thereto, lifting the front wheel into anchoring position within the L-shaped housing of an anchoring support assembly using a winch operationally tied to a belt wound about a major portion of the circumference of the front tire.

In one aspect, spanning the circumference of the front tire is augmented by a metallic, arcuate pivot arm projecting from the side walls of the L-shaped housing and pivotally attached to the latter at a transverse pivot axis located adjacent to the intersection of the floor and the side walls of the housing, such transverse pivot axis also being positioned a distance D above the earth's surface where D is about equal to the radius R of the front wheel. The arcuate arm acts as a teeter-totter for lifting the front wheel about the transverse pivot axis relative to the earth's surface. In another aspect, the winch belt is bifurcated at its attached end relative to the arcuate pivot arm to allow for easy centering of winch belt about the remainder of the circumference of the front tire, in yet another aspect, the L-shaped housing of the anchoring support is pivotally attached at its rear wall to the Class III receiver along a vertical direction normal to the earth's surface. Result: the trailing capability of the motorcycle via the rear wheel only, is enhanced.

BACKGROUND OF THE INVENTION

The prior art is replete with towing devices for motorcycles. For example, U.S. Pat. No. 5,145,308 shows towing hitch for a motorcycle in which there is an absence of a winch for lifting the front wheel of the cycle relative to a Class III receiver. Result: a single person of average strength cannot use the same easily. In similar fashion, U.S. Pat. No. 5,366,338 shows towing device in which a complicated winch is depicted in association with elevating the motorcycle. A winch strap is attached to a cross member wherein the cross member (carrying the motorcycle) lifts a L-shaped support along a pair of vertical rails. However, the heaviness of the device prevents easy stowage, say within the motor vehicle when not in use. Most users prefer such devices not be permanently attached to the vehicle, so that the atheistic look of the vehicle is not compromised.

SUMMARY OF THE INVENTION

The present invention related to a towing hitch for towing an up-sloped positioned motorcycle at the rear of a motor vehicle having a Class III receiver, the towing hitch comprising an anchoring support assembly attached to the Class III receiver, the latter including a L-shaped housing, a winch barrel pivotally attached between upright side walls and pivotal about a transverse axis and a winch belt operationally attached to the winch barrel and wound about a major circumferential portion of the front tire of the motorcycle. In one aspect, the full span of the circumference of the front tire is augmented by a metallic, arcuate pivot arm attached between and projecting from the side walls at the front of the L-shaped housing via a second transverse pivot axis positioned a distance D above the earth's surface where D is about equal to the radius R of the front wheel. In another aspect, the belt is bifurcated at its attached to the arcuate pivot arm to allow for easy attachment about the tread of the front tire. In yet another aspect, the L-shaped housing is pivotally attached at its rear wall along a vertical direction normal to the earth's surface relative to the Class III receiver. Result: the trailing capability of the motorcycle via the rear wheel only, is enhanced.

BRIEF DESCRIPTION OF THE DRAWINGS

FIG. 1 is a perspective view of the invention attached to to a Class III receiver of a rear of a motor vehicle illustrating usage for towing a motorcycle;

FIG. 2 is a side view of the invention of FIG. 1 in which the front wheel of the motorcycle is shown elevated about the earth's surface while the rear wheel contacts same;

FIG. 4 is another side view—partially schematic—of the invention akin to FIG. 3 in which the front wheel of the motorcycle shown in phantom line enclosed within the L-shaped housing wherein the front wheel has been provided with upward elevation via a teeter-totter effect of the arcuate pivot arm of FIG. 3;

FIG. 5 is a detail perspective view of the arcuate pivot arm of FIGS. 1–4;

FIG. 6 is a detail perspective view of the winch belt of FIGS. 1–4;

FIG. 7 is a perspective detail of the stub assembly of the invention;

FIG. 8 is a detail, partial side view of another stub assembly of the invention for attaching the L-shaped housing relative to the Class III receiver of FIGS. 1–4; and FIG. 9 is enlarged detail of the stub assembly of FIG. 8 taken along line 9—9 thereof.

DETAILED DESCRIPTION OF THE INVENTION

Figure 3:
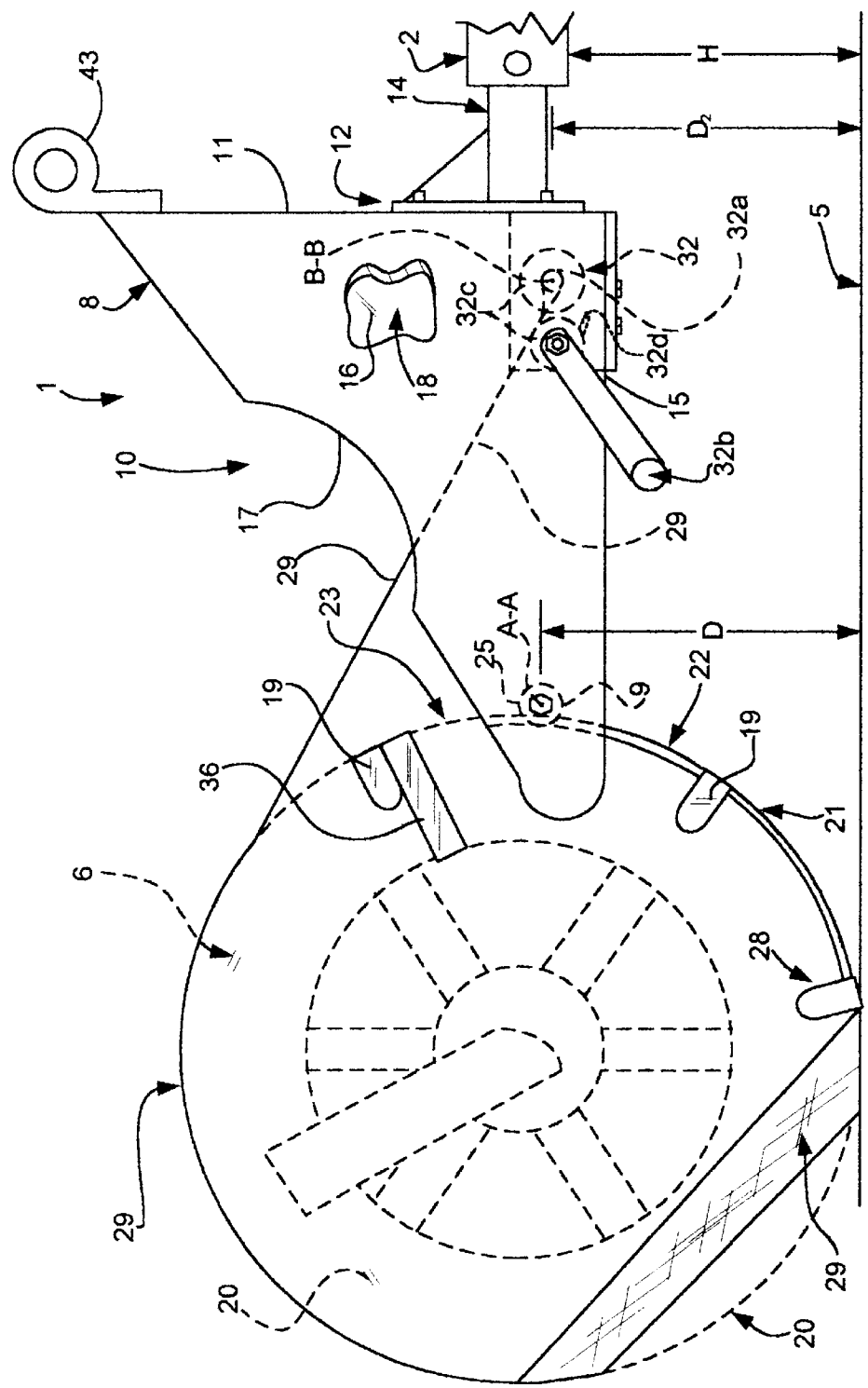
FIG. 3 is an enlarged side view of the invention of FIG. 2 in which the front wheel of the motorcycle is shown in phantom line in pre-loading sequence before the motorcycle is placed in the position of FIG. 2 wherein the tire is circumscribed by a winch belt attached to an arcuate pivot arm projecting from a L-shaped housing of an anchoring support assembly supported by the Class III receiver, the anchoring support assembly including an elongated stub assembly attached at the rear wall of the L-shaped housing.

FIGS. 1 and 2 depict the towing hitch 1 of the invention releasably attached to a conventional Class III receiver 2 for towing motorcycle 3 in an up-slope position, viz., with only rear wheel 4 of motorcycle 3 in contact with the earth's surface 5. The Class III receiver 2 includes a longitudinal central support 2a of rectangular in cross section attached to the under-carriage 7a of the motor vehicle 7 in conventional fashion. Such Class III receiver 2 can include a transverse strut 2b extending from the central support 2a.

As shown in FIGS. 3 and 4, the loading sequence of the motorcycle relative to the tow hitch 1 is depicted. As shown, the tow hitch 1 includes an anchoring support assembly 10 fixedly attached to the conventional Class III receiver 2. The anchoring support assembly 10 comprises L-shaped housing 8 including a rear wall 11 to which a stub assembly 12 is attached at a selected height H above the earth's surface 5, using at the rear wall 11 a set of opening selected from a series of openings 11a, see FIG. 7.

As shown in FIG. 7, the stub assembly 12 includes planar wall support 13 having a broad surface 13a to which a rectangular bar or pintle 14 is attached. The broad surface 13a includes a pair of openings 13b through which a pair of bolts 13c are provided. The pair of bolts 13c extend through the selected set of openings of the series of openings 11a in the rear wall 11 of the L-shaped housing 8 and thence through the pair of openings 13b of the planar wall support 13 and thence attached to nuts 13d.

Returning to FIGS. 3 and 4, the purpose of pintle 14; to non-rotationally attached the L-shaped housing 8 relative to the Class III receiver 2 by insertion of the pintle 14 within the interior of the receiver 2.

In addition to the rear wall 11, the L-shaped housing 8 also has a floor 15 and triangular side walls 16 open along broad edges 17 to define a receiving cavity 18.

In order to load the motorcycle, the anchoring support assembly 10 has a pivot arm 21 that forms a pivoting, teeter-totting ramp for elevating front wheel 6 of the motorcycle from the earth's surface 5. As shown in FIG. 5, the pivot arm 21 includes a main region 22, a near end 23 supporting a bulbous transversely extending support 9, a far end 28 and a series of ears 19 therealong.

Returning to FIG. 3, the main region 22, the near end 24 and the far end 28 are shaped to fit about ¼ of the circumference of tire 20 of the front wheel 6 of the motorcycle. The bulbous support 9 of the arm 21 contains a transverse opening 24 (FIG. 5) into which is inserted a pivot pin 25 (FIG. 3) for the purpose of establishing a transverse pivot axis A—A a distance D above the earth's surface 5 thereby pivotally attaching the pivot arm 21 relative to the side walls 16 of the L-shaped housing 8 of the anchoring support 10, and a far end 28 to which a wheel strap 29 is attached.

Wheel strap 29 is of nylon or like material and includes bifurcated fixed end segment 30, see FIG. 6, attached to the far end 28 of the pivot arm 21. The free end segment 31 of the wheel strap 29 also includes a hook and loop fastener 27, such as VELCRO (hook segment 27a and loop segment 27b) and in operations is guided about the remaining ¾ of the circumference of the tire 20 in the manner of FIG. 3, and thence is folded back on itself to from a loop about winch barrel 32a of winch assembly 32 as shown in FIGS. 3 and 4. Such winch barrel 32a defines a transverse axis B—B parallel to the aforementioned axis A—A and is seen to be positioned a distance D1 above the earth's surface 5.

As shown in FIGS. 3 and 4, the winch assembly 32 is positioned between the side walls 16 adjacent to rear wall 11 of the L-shaped housing 8 of the anchoring support 10, and includes (in addition to winch barrel 32a), a winch crank 32b, drive and driven gears 32c and a locking pawl 32d.

In operations, after the front wheel 6 of the motorcycle 3 is rolled into the main region 22 of the pivot arm 21 as shown in FIG. 3, the motorcycle 3 is secured in an upright position relative to the fixed receiver 2 using a series of stabilizing straps 35, see FIG. 1, in which the final position of such straps 35 are shown. A cradle strap 36 is then inserted through and about the spokes of the front wheel 6 to secure the same relative to the pivot arm 21. Then the free end segment 31 of the wheel strap 29 is fitted about the front tire 20 over its remaining circumference and thence is attached to the winch assembly 32 as previously explained, viz., by securing the Velcro connector 27 of FIG. 6 relative to the winch barrel 32a.

Loading operations of the motorcycle 3 are straightforward.

When the winch assembly 32 is activated, the active length of wheel strap 29 is shortened. That is, with the wheel strap 29 secured to the winch barrel 32a of the winch assembly 32, the winch barrel 32a is then rotated about transverse axis B—B via winch crank 32b, drive/driven gears 32c, with locking pawl 32d acting to prevent counter-rotation.

Result: the foreshortened active length of the wheel strap 29 in tight contact about the circumference of the tire 20 of the front wheel 6, causes the pivot arm 21 to pivot about pivot pin 25, i.e., about transverse axis A—A, to thereby lift the front wheel 6 relative to the earth's surface 5 and place the same within the cavity 18 of the L-shaped housing 8 as shown in FIG. 4. Thereafter, another strap 42, also see FIG. 4, is inserted through eyebolt 43 adjacent to the rear wall 11 and thence about the front tire 20.

Advantages of the tow hitch 1: one man can load the motorcycle 3; the hitch 1 is compact and when not in use, can be stowed in the trunk of the convention automobile. It is also safe since the motorcycle 3 is secured to the hitch 1 by straps 36, 42 at two separate locations as well as by the cavity 18 of the L-shaped housing 8 of the anchoring support assembly 10. Additionally, a trailer license is not required.

FIGS. 8 and 9 show an alternative in the attachment of the anchoring support assembly 10 relative to Class III receiver 2.

As shown, planar wall 13' of the stub assembly 12' includes a pair of spaced-apart ears 40 attached to broad surface 13a' thereof, as by welds (not shown), facing toward receiver 2. The purpose of the ears 40: to permit a rotatable fit about and attached to end segment 42 of the central support 2a of the Class III receiver 2, see FIG. 9. Ears 40 have aligned openings 43 into which a vertical pin 44 is placed to define a vertical pivotal axis C—C normal to the earth's surface. Note that openings 45 in end segment 42 allow penetration by the vertical pin 44 therethrough.

In operation, the ears 40 in association with pin 44 permit the anchoring support 10 to rotate relative to the Class III receiver 2. Result: enhanced trailering of the attached motorcycle.

While various modifications, changes and alternatives are suggestible to one skilled in the art based on the descriptions set forth above, the invention is to be given the broadest interpretation based on the scope of the appended claims.

What is claimed is:

1. A towing hitch for towing an up-sloped positioned motorcycle that includes an up-lifted front wheel having a tire of radius R and a road-riding rear wheel, said towing occurring from the rear of a motor vehicle having a Class III receiver, comprising an anchoring support assembly including a pintle attachable to said Class III receiver, a winch barrel, a L-shaped housing including upright side walls to which said winch barrel is pivotally attached, an arcuate pivot arm defining a portion extending from said L-shaped housing, and a single wheel belt operationally attached to said arcuate pivot arm, said arcuate pivot arm being pivotally attached to said upright side walls at a transverse axis a distance D above the earth's surface as well as being releasable attached to a minor circumferential portion of said tire of said front wheel, said winch barrel being pivotal about a transverse axis a distance D1 above the earth's surface whereby said wheel belt operationally attached between said winch barrel and said arcuate pivot arm is forced into winding contact with a major circumferential portion of said front tire of said motorcycle to secure same relative to said anchoring support assembly and permits and motorcycle to be easily loaded relative to said anchoring support assembly via a teeter-tottering action of said arcuate pivot arm in driving contact therewith.

2. The towing hitch of claim 1 in which said arcuate pivot arm of said anchoring support assembly is metallic and includes a transverse pivot axis a distance D above the earth's surface where D is about equal to R, said arcuate pivot arm having a first end segment, a central segment attached to said first end segment and enclosing said minor circumferential portion of said tire of said front wheel and in operations acting as a teeter-totting ramp for loading said front wheel relative to said L-shaped housing of said anchoring support assembly.

3. The towing hitch of claim 2 in which said wheel belt includes a bifurcated end segment attached to said first end segment of said arcuate pivot arm, and a free end segment attached to said winch barrel via a hook and loop connector wherein rotation of said winch barrel causes teeter-totter loading of said front wheel relative to said L-shaped housing via said arcuate pivot arm.

4. The towing hitch of claim 2 in which said anchoring support assembly includes an upright rear wall, a stub assembly including said pintle attached to said rear wall, said pintle extending into and mounted interior of said Class III receiver.

5. In towing an up-sloped positioned motorcycle relative to the rear of a motor vehicle, the combination comprising (i) a Class III receiver permanently attached to the rear of a motor vehicle, (ii) a motorcycle including a front wheel having a tire of radius R and a road-riding rear wheel, and (iii) a tow hitch for releasably towing said motorcycle relative to said Class III receiver, comprising an anchoring support assembly including a pintle attachable to said Class III receiver, a winch barrel, a L-shaped housing including upright side walls to which said winch barrel is pivotally attached, an arcuate pivot arm defining a portion extending from said L-shaped housing, and a single wheel belt operationally attached to said arcuate pivot arm, said arcuate pivot arm being pivotally attached to said upright side walls at a transverse axis a distance D above the earth's surface as well as being releasable attached to a minor circumferential portion of said tire of said front wheel, said winch barrel being pivotal about a transverse axis a distance D1 above the earth's surface whereby said wheel belt operationally attached between said winch barrel and said arcuate pivot arm is forced into winding contact with a major circumferential portion of said front tire of said motorcycle to secure said relative to said anchoring support assembly and permits said motorcycle to be easily loaded relative to said anchoring support assembly via a teeter-tottering action of said arcuate pivot arm in driving contact therewith.

6. The towing hitch of claim 5 in which said arcuate pivot arm of said anchoring support assembly is metallic and includes a transverse pivot axis a distance D above the earth's surface where D is about equal to R, said arcuate pivot arm having a first end segment, a central segment attached to said first end segment and enclosing said minor circumferential portion of said tire of said front wheel and in operations acting as a teeter-totting ramp for loading said front wheel relative to said L-shaped housing of said anchoring support assembly.

7. The towing hitch of claim 6 in which said wheel belt includes a bifurcated end segment attached to said first end segment of said arcuate pivot arm, and a free end segment attached to said winch barrel via a hook and loop connector wherein rotation of said winch barrel causes teeter-totter loading of said front wheel relative to said L-shaped housing via said arcuate pivot arm.

8. The towing hitch of claim 6 in which said anchoring support assembly includes an upright rear wall, a stub assembly including said pintle attached to said rear wall, said pintle extending into and mounted interior of said Class III receiver.

9. A towing hitch for towing an up-sloped positioned motorcycle that includes an up-lifted front wheel having a tire of radius R and a road-riding rear wheel, said towing occurring from the rear of a motor vehicle, comprising an anchoring support assembly attachable to said rear of said motor vehicle, a winch barrel, a housing including upright side walls to which said winch barrel is pivotally attached, an arcuate pivot arm pivotally attached to and extending from said housing, and a single wheel belt operationally attached between said arcuate pivot arm and said winch barrel, said arcuate pivot arm being pivotally attached to said housing at a transverse axis a distance D above the earth's surface as well a being releasable attachable in operations to a minor circumferential portion of said tire of said front wheel wherein rotation of said winch barrel foreshortens said wheel belt into winding contact with a major circumferential portion of said front tire to secure same relative to said anchoring support assembly and permits said motorcycle to be easily loaded relative to said anchoring support assembly via a teeter-tottering action of said arcuate pivot arm in driving contact therewith.

10. The towing hitch of claim 9 in which said arcuate pivot arm of said anchoring support assembly is metallic and includes a first end segment, a central segment attached to said first end segment and in operations enclosable over said minor circumferential portion of said tire of said front wheel, said pivot arm causing the elevation of said front wheel into stowage within said housing via teeter-totting pivoting movement relative thereto.

11. The towing hitch of claim 10 in which said wheel belt includes a bifurcated end segment attached to said first end segment of said arcuate pivot arm, and a free end segment attached to said winch barrel via a hook and loop connector wherein rotation of said winch barrel causes teeter-totter loading of said front wheel relative to said housing via said arcuate pivot arm.

12. The towing hitch of claim 10 in which said housing is L-shaped in cross section and includes an upright rear wall and a stub assembly including said pintle attached to said rear wall, said pintle extending into and mounted interior of a Class III receiver permanently attached to said motor vehicle.

* * * * *